United States Patent
Morley (12)

(10) Patent No.: US 6,975,358 B1
(45) Date of Patent: Dec. 13, 2005

(54) DUAL CHANNEL IMAGING DEVICE

(75) Inventor: Roland M. Morley, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 1076 days.

(21) Appl. No.: 09/652,431

(22) Filed: Aug. 31, 2000

(51) Int. Cl.⁷ .............................................. H04N 5/225

(52) U.S. Cl. ...................... 348/335; 348/341; 348/344

(58) Field of Search ................................ 348/341, 343, 348/344, 345, 335, 80; 359/672, 419, 227, 359/618, 629, 639–640, 831; 396/84

(56) References Cited

U.S. PATENT DOCUMENTS

| | | | | |
|---|---|---|---|---|
| 4,237,492 A | * | 12/1980 | Roth et al. .................. 348/344 |
| 4,772,903 A | * | 9/1988 | Labaziewicz ................ 396/84 |
| 5,121,220 A | * | 6/1992 | Nakamoto .................. 359/419 |
| 5,483,284 A | * | 1/1996 | Ishiguro ..................... 348/338 |
| 6,130,714 A | * | 10/2000 | Abe et al. ................... 348/335 |
| 6,400,395 B1 | * | 6/2002 | Hoover et al. ............... 348/80 |

\* cited by examiner

Primary Examiner—James J. Groody
Assistant Examiner—Brian Jelinek
(74) Attorney, Agent, or Firm—Trop, Pruner & Hu, P.C.

(57) ABSTRACT

An imaging device may include two channels, for example each with different magnification or fields of view as two examples. The user may select one of the channels and the image captured through that channel may be both viewed through a viewfinder and recorded on an imaging array or other recording media.

3 Claims, 1 Drawing Sheet

DUAL CHANNEL IMAGING DEVICE

BACKGROUND

This invention relates generally to imaging devices and particularly to optical systems for imaging devices.

A wide variety of imaging devices are available including cameras, telescopes and microscopes as examples. In many cases, an imaging array is integrated with these optical devices to record an image produced by the optical device.

Sometimes a zoom lens is provided to enable different fields of view. For example, a narrow field of view and a wide field of view may be obtained by the same zoom lens. Thus, the zoom lens may selectably produce an image with a narrow or wide field of view. The image from the zoom lens may be captured by an imaging array at the same time it is viewed by the user through a viewfinder.

However, the use of a zoom lens results in substantially increased cost for the imaging device. This is because of the relative cost of the zoom lens compared to fixed field of view lenses. Zoom lenses are more expensive to manufacture because there are optical moving parts that may increase the need for precision components and mounting surfaces.

Thus, there is a need for an imaging device which provides for different fields of view without incurring the cost of a zoom lens.

DETAILED DESCRIPTION

Figure 1:
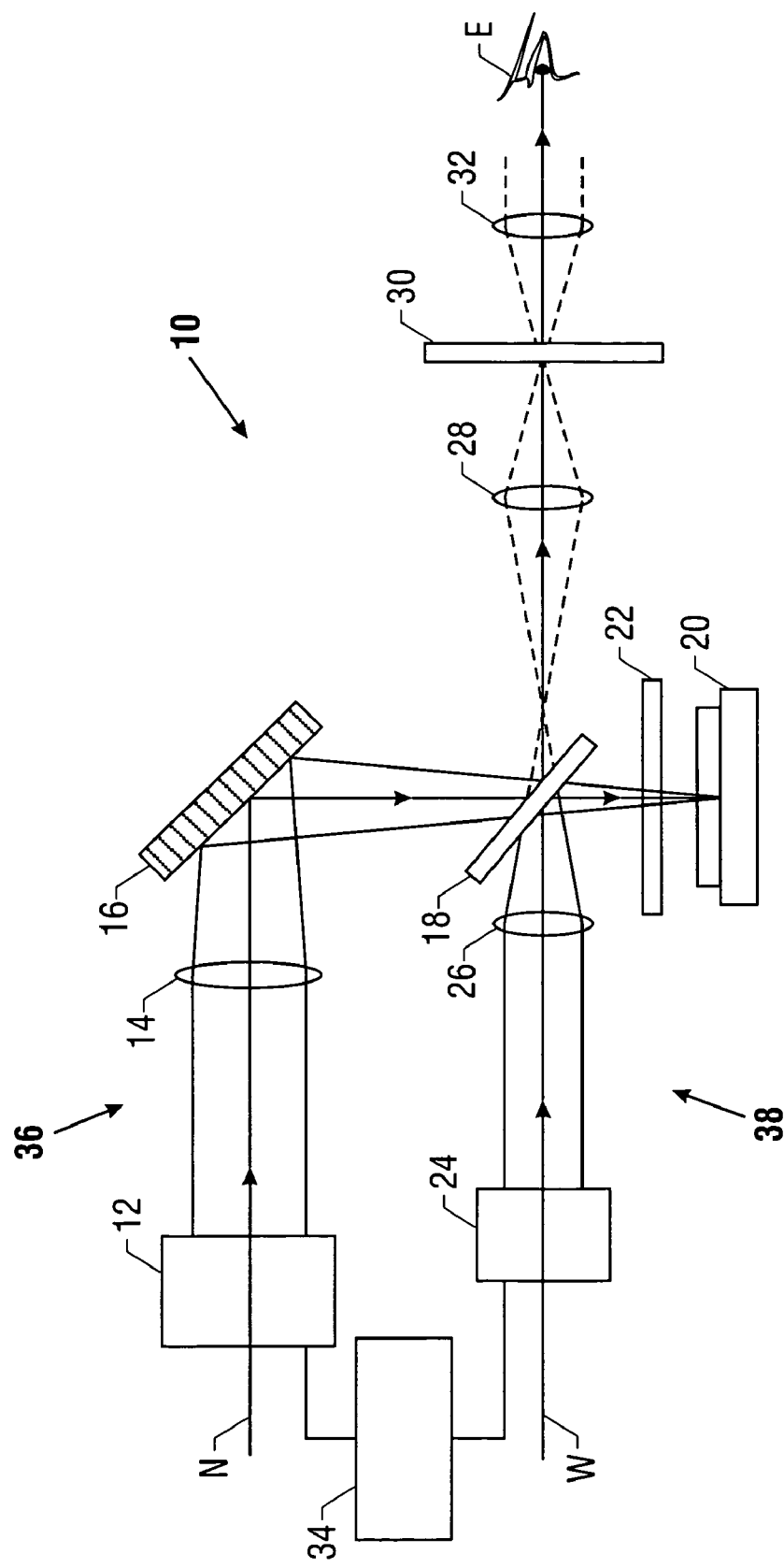
FIG. 1 is a schematic depiction of one embodiment of the present invention.

Referring to FIG. 1, an imaging device 10 may be a digital camera, a telescope, a microscope or other imaging device. The viewer, indicated as E, views the received images through an eyepiece 32 that may be part of a direct viewfinder. A focus screen 30 receives an image from a relay lens 28.

Two different optical paths N and W are utilized in accordance with one embodiment of the present invention. However, in other cases, more than two optical paths may be utilized.

The first optical path N includes an optical system 36 having a shutter 12, an adjustable focus, relatively narrow field of view lens 14, and a mirror 16. Instead of using a spherical lens as the lens 14, other optical devices including a flat or Fresnel lens may be utilized. A fixed or adjustable focus manual lens may be used as the lens 14. If an adjustable focus lens is used, it may be a manual or autofocus lens.

The lens 14 provides a relatively narrow field of view and may be moved along the optical path N to adjust its focus. The image from the lens 14 is reflected by the mirror 16 to an infrared (IR) filter 22 and an imaging array 20.

While a digital imaging array 20 is illustrated, any recording media may be utilized including conventional film. The imaging array 20 may, for example, be a complementary metal oxide semiconductor (CMOS) sensor or a charge coupled device (CCD) sensor, as two examples.

A second optical path W includes an optical system 38 having a shutter 24, a relatively wide field of view lens 26 and a beamsplitter 18. A fixed or adjustable focus manual lens may be used as the lens 26. If an adjustable focus lens is used, it may be a manual or autofocus lens. When the shutter 24 is passing light, the optical path W provides light that is reflected by the beamsplitter 18 to the imaging array 20. The beamsplitter 18 may be a parallel plate or cubic beamsplitter as two examples.

In one embodiment of the present invention, only one of the paths N or W is active at any one time. That is, the state of the shutters 12 and 24 may be controlled by a control device 34 that may receive user inputs. The user may select either a narrow or a wide field of view. If the user selects a narrow field of view, the shutter 12 in the optical path N is opened and conversely if the user selects a wide field of view, the shutter 24 in the optical path W is opened. However, in one embodiment, only one of the shutters 12 or 24 is opened or passing light at any given time.

The active light path N or W provides light not only to the imaging array 20 but also to the eyepiece 32 for viewing by the user. In the case of the light path N, light is reflected by the beamsplitter 18 to the eyepiece 32. In the case of the light path W, light is passed by the beamsplitter 18 to the eyepiece 32. The beamsplitter 32 may pass 50% of the incident light in one embodiment of the invention.

The screen 30 may be used in a manual focus system. The lenses 28 and 32 adjust the resulting image for viewing by the user's eye E.

Thus, a dual channel system enables the user to select either a narrower or wider field of view. The images captured through the selected optical path may be recorded on the imaging array 20 while being viewed through the eyepiece 32. In this way, a selectable field of view may be obtained without the need for a zoom lens. In particular, a narrower or wider field of view may be selected without the need for moving lenses or optical systems in some embodiments.

As an example, the imaging device 10 may be a camera and the lens 14 may be a macro lens for close-up viewing and the lens 26 may be a conventional lens. As another example, one of the lenses 14 or 26 may have a different magnification than the other lens 14 or 26. Whichever optical system 36 or 38 is selected, the captured image is available for viewing by the user indicated at E at the same time.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A camera comprising:
    a first optical path having a shutter and a lens with a first field of view;
    a second optical path including a shutter and a lens with a second field of view different from said first field of view;
    an image capture device to selectively receive an image from one of said first and second optical paths;
    an eyepiece to display the image received by said image capture device; and
    a beamsplitter to enable light from the selected optical path to be passed both to an imaging array and said eyepiece, said beamsplitter including a first surface to receive light on said first optical path, and a second surface different from said first surface to receive light on said second optical path.

2. The camera of claim 1 wherein said shutters are controlled so that only one of said shutters is open at a time.

3. The camera of claim 2 including a controller to enable a user to select one of said shutters to pass light.

* * * * *